W. H. CARRIER.
AIR COOLING APPARATUS.
APPLICATION FILED JAN. 19, 1912.

1,078,608.

Patented Nov. 18, 1913.
2 SHEETS—SHEET 1.

Witnesses
A.F. Dimond.
A. Borkenhagen

Inventor.
Willis H. Carrier,
By Wilhelm, Parker & Hardy
Attorneys.

W. H. CARRIER.
AIR COOLING APPARATUS.
APPLICATION FILED JAN. 19, 1912.

1,078,608.

Patented Nov. 18, 1913.

2 SHEETS—SHEET 2.

Witnesses.

Inventor.

UNITED STATES PATENT OFFICE.

WILLIS H. CARRIER, OF BUFFALO, NEW YORK, ASSIGNOR TO BUFFALO FORGE COMPANY, OF BUFFALO, NEW YORK.

AIR-COOLING APPARATUS.

1,078,608.   Specification of Letters Patent.   Patented Nov. 18, 1913.

Application filed January 19, 1912. Serial No. 672,152.

*To all whom it may concern:*

Be it known that I, WILLIS H. CARRIER, a citizen of the United States, residing at Buffalo, in the county of Erie and State of New York, have invented a new and useful Improvement in Air-Cooling Apparatus, of which the following is a specification.

This invention relates more particularly to improvements in apparatus for cooling and dehumidifying or drying air, the object thereof being to produce an apparatus of large capacity which can be installed at comparatively small expense and which will be economical in operation and of high efficiency.

Figure 1:
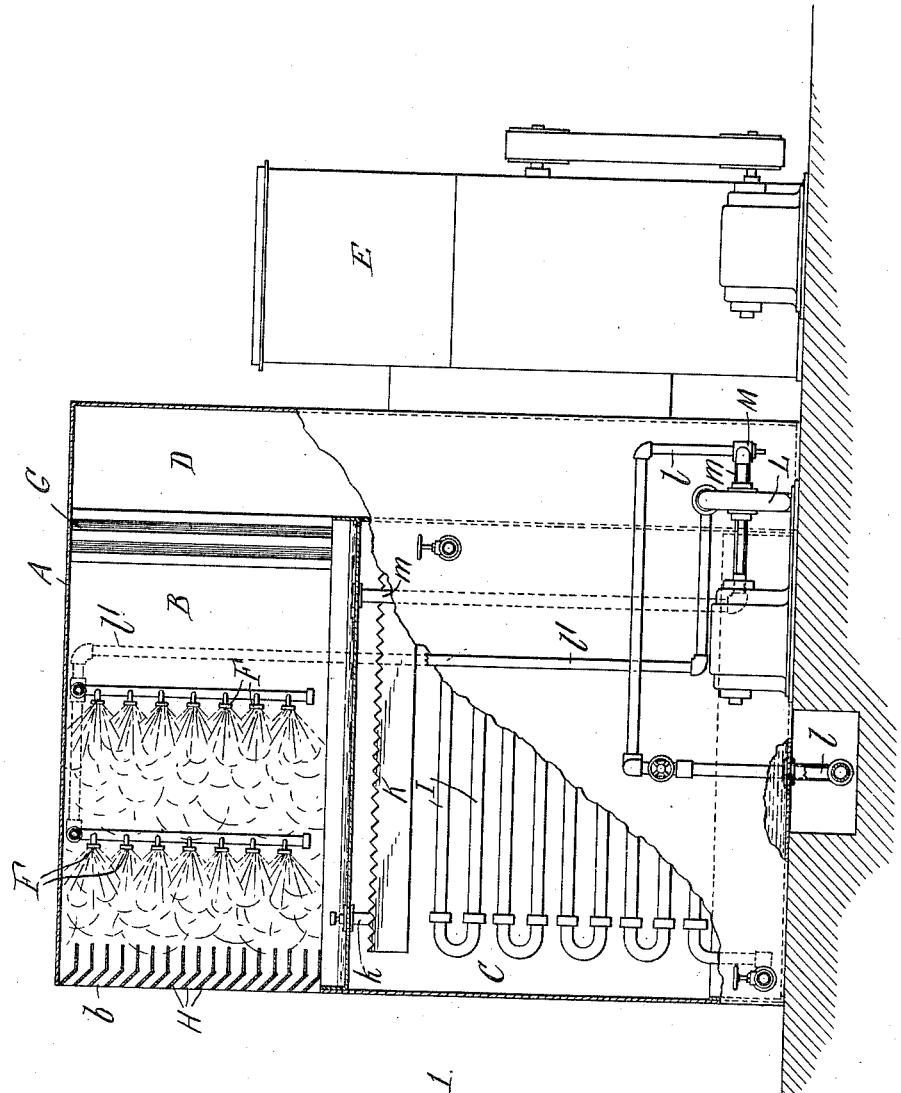
Figure 2:
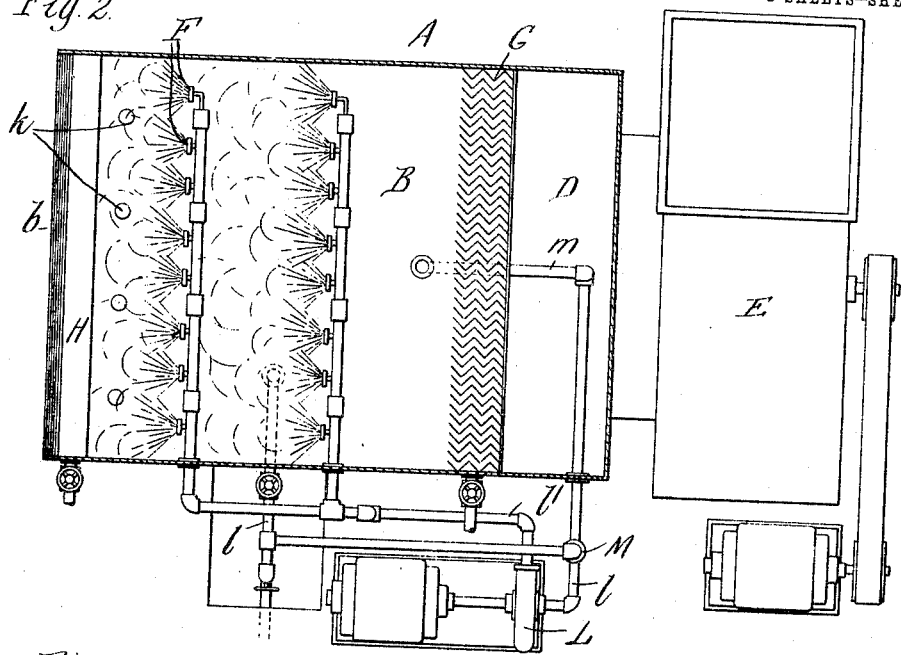
Figure 3:
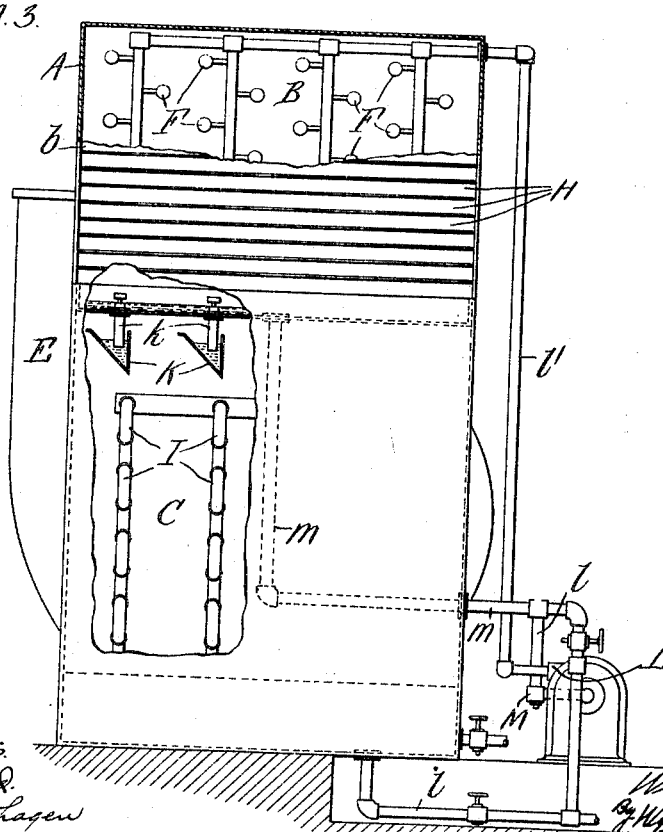

In the accompanying drawings: Figure 1 is a side elevation, partly in section, of an apparatus embodying the invention. Fig. 2 is a plan view, partly in section, thereof. Fig. 3 is an end elevation, partly in section, thereof.

Like reference characters refer to like parts in the several figures.

A represents a casing of any suitable construction which is partitioned to provide in its upper portion an air cooling or spray chamber B and below the same, a water cooling or refrigerating chamber C. The spray chamber is open at one end $b$ for the entrance of air and connects at its opposite end with a passage D, also preferably formed in the casing A, which leads to a fan or air propelling device E by which the air is caused to pass through the air cooling or spray chamber B and is delivered to a required place. The air does not pass through the liquid cooling chamber C.

F represents spray nozzles adapted to discharge cold water, or other cooling liquid, in the form of a very fine spray or mist into the spray chamber so that the air passing through the chamber will be brought into intimate contact with the cold liquid and will have its temperature lowered thereby. The nozzles preferably discharge in a direction in opposition to the flow of the air, as a more complete saturation of the air is secured in this way. After contact with the liquid spray the air passes through an eliminator G, which separates the free moisture from the air. The eliminator may be of any suitable construction, but preferably consists of upright parallel zigzag plates between which the air passes and on the surfaces of which the moisture collects. H represents baffle plates arranged in the entrance of the spray chamber for distributing the air equally throughout the spray chamber.

The liquid, which collects from the spray nozzles and eliminator in the bottom of the spray chamber, is discharged therefrom into the upper part of the cooling chamber C and flows downwardly over suitable cooling coils or pipes I in the cooling chamber, being cooled or refrigerated by a cooling medium which circulates through the cooling coils. The spray liquid collecting from the cooling coils in the bottom of the cooling chamber is pumped back to the spray nozzles and used again. Cooling coils of any suitable kind can be used, such for instance, as the ammonia coils ordinarily employed in refrigerating apparatus. The means for circulating and condensing the ammonia, which are not shown, may be of the usual construction.

In order to distribute the spray liquid uniformly over the cooling coils and thereby equalize the work thereof, it is, in the apparatus shown, delivered from the spray chamber B by pipes $k$ into distributing troughs K which are arranged in the upper part of the cooling chamber, one over each vertical tier of the cooling coils I. The distributing troughs are of substantially V-shape, having vertical walls with serrated upper edges. The liquid overflows from the troughs and runs down the vertical walls thereof, dripping from their lower edges onto the cooling coils, over which it flows downwardly by gravity. The pipes $k$ dip into the liquid in the troughs, or liquid seals are otherwise provided to prevent the temperature of one chamber being communicated to the other. The distributing troughs shown are not new and these or any other suitable means for distributing the spray liquid over the cooling coils can be used.

In the apparatus shown, a motor driven pump L draws the spray liquid from a settling tank in the bottom of the cooling chamber C by a suction pipe $l$ and forces it to the spray nozzles F through a discharge pipe $l'$, so that the liquid is circulated and repeatedly used. The suction pipe $l$ is provided with a mixing valve M which is connected by a branch pipe $m$ with the bottom of the spray chamber, so that by appropriately adjusting the mixing valve the cold liquid from the cooling chamber C and the warmer liquid from the spray chamber B can be mixed in any proportions necessary to obtain a desired temperature of the spray liquid. The mixing valve can be operated by hand or automatically under the control of a thermostat, as may be desired.

In the use of the apparatus, the fan draws the air through the spray chamber B, which is filled with the fine spray of cooling liquid, so that all portions of the air are brought into intimate contact with the spray which cools the air and causes its moisture to be precipitated. The spray liquid and the free moisture taken from the air, which collect in the bottom of the spray chamber, flow by gravity into the cooling chamber C over the cooling coils therein, whereby the liquid, which has been warmed by contact with the air, is again cooled to the proper temperature. The required temperature of the cooling liquid is maintained by adjusting the mixing valve M to mix the liquid from the spray chamber and from the cooling chamber in proper proportions.

By the described construction and arrangement of the apparatus the air is brought into direct contact with the fine spray of liquid and a much more intimate and thorough contact of the air with its cooling medium, and consequently a much higher efficiency, is thus secured than can be obtained by passing the air over cooling pipes or surfaces. A larger volume of air can be cooled to a given temperature than in a chamber of like dimension provided with cooling pipes, and less resistance is offered to the passage of the air. The spray nozzles are also less expensive than cooling pipes. Since the spray chamber is located over the cooling chamber the water flows by gravity over the cooling pipes, and a pump is not required to lift the water to the top of the cooling chamber, as would be necessary except for the location of the spray chamber higher than the cooling chamber; and the water is more efficiently cooled by causing it to flow in thin films over the cooling pipes than it could be by cooling pipes submerged in a body of water in a cooling tank.

I claim as my invention:

1. In apparatus for cooling air, the combination of a casing divided by a transverse partition into an upper spray chamber through which the air passes and a lower liquid cooling chamber through which the air does not pass, means for causing air to flow through said spray chamber, means for spraying liquid into said spray chamber to cool the air, liquid cooling coils in said cooling chamber, distributing troughs located above said cooling coils for distributing liquid over said coils, said partition forming a collecting basin for the liquid sprayed into said spray chamber and the condensed moisture, pipes extending from the bottom of said spray chamber, the ends of said pipes being immersed in the water in said distributing troughs whereby a water seal is formed between said spray and cooling chambers to prevent the passage of heat from one to the other, and means for returning the cooled liquid from said cooling chamber to said spraying means, substantially as set forth.

2. In apparatus for cooling air, the combination of a casing having a vertical partition dividing off a portion of the casing at one end thereof, and a horizontal partition dividing the part of the casing at one side of said vertical partition into upper and lower chambers, the end wall of said upper chamber having an air inlet formed therein, the opposite end of said upper chamber opening into the space divided off by said vertical partition, spray devices located in said upper chamber, liquid cooling coils located in the chamber below said horizontal partition, connections from the bottom of said upper chamber to the upper portion of said lower chamber, whereby the spray liquid flows by gravity from said upper chamber downwardly over said cooling coils, means for returning the cooled liquid from said cooling chamber to said spray devices, a fan located adjacent to said casing, and a connection from the suction side of said fan to the lower end of the part of said casing divided off by said vertical partition, substantially as set forth.

3. In apparatus for cooling air, the combination of a casing having a horizontal partition therein extending part way across the casing and dividing the same into upper and lower chambers, the front wall of said casing above said partition being open and having baffle plates mounted therein, a vertical partition mounted in said casing and extending up to the rear edge of said horizontal partition, said vertical partition shutting off said lower chamber from a vertical air space at the end of said casing, an eliminator comprising upright eliminator plates mounted at the rear end of said upper chamber and between the same and said vertical air space, spray pipes having spray heads in said upper chamber arranged to discharge toward the baffle plates at the front of said chamber, liquid cooling coils mounted in said lower chamber, connections from the bottom of said upper chamber to the upper portion of said lower chamber, whereby the spray liquid flows by gravity from said upper chamber downwardly over said cooling coils, means for returning the cooled liquid from said lower chamber to said spray pipes, and an air outlet at the lower portion of said vertical air space, substantially as set forth.

Witness my hand, this 16th day of January, 1912.

WILLIS H. CARRIER.

Witnesses:
RICHARD C. WILLIAMS,
HOWARD C. RICE.